US 11,928,066 B2

United States Patent
Van Bourgognie et al.

(10) Patent No.: US 11,928,066 B2
(45) Date of Patent: Mar. 12, 2024

(54) I2C BRIDGE DEVICE

(71) Applicant: Iristick NV, Sint-Martens-Laten (BE)

(72) Inventors: Jasper Van Bourgognie, Berchem (BE); Vianney Le Clément de Saint-Marcq, Brussels (BE); Riemer Grootjans, Antwerp (BE); Peter Verstraeten, Sint-Martens-Latem (BE)

(73) Assignee: IRISTICK NV, Sint-Martens-Latem (BE)

( * ) Notice: Subject to any disclaimer, the term of this patent is extended or adjusted under 35 U.S.C. 154(b) by 113 days.

(21) Appl. No.: 16/470,264

(22) PCT Filed: Dec. 15, 2017

(86) PCT No.: PCT/EP2017/083003
§ 371 (c)(1),
(2) Date: Jun. 17, 2019

(87) PCT Pub. No.: WO2018/109160
PCT Pub. Date: Jun. 21, 2018

(65) Prior Publication Data
US 2020/0012611 A1    Jan. 9, 2020

(30) Foreign Application Priority Data

Dec. 15, 2016 (EP) .................... 16204429

(51) Int. Cl.
*G06F 13/40* (2006.01)
*G06F 13/42* (2006.01)
*H04L 5/14* (2006.01)

(52) U.S. Cl.
CPC ...... *G06F 13/4045* (2013.01); *G06F 13/4031* (2013.01); *G06F 13/4291* (2013.01); *H04L 5/14* (2013.01); *G06F 2213/0016* (2013.01)

(58) Field of Classification Search
CPC ............. G06F 13/4031; G06F 13/4045; G06F 13/4291; G06F 2213/0016; H04L 5/14
(Continued)

(56) References Cited

U.S. PATENT DOCUMENTS 6,038,623 A    3/2000 Schutte
6,874,052 B1 *    3/2005 Delmonico ......... G06F 13/4045
                                                        710/110
(Continued)

FOREIGN PATENT DOCUMENTS

WO    0210933 A1    2/2002
WO    02097642 A1   12/2002

*Primary Examiner* — Farley Abad
*Assistant Examiner* — Brooke J Taylor
(74) *Attorney, Agent, or Firm* — Cermak Nakajima & McGowan LLP; James Creighton Wray

(57) ABSTRACT

The present invention relates to a bridge device operable between a master device and a slave device of a communication system, said master device and said slave device arranged for communicating with each other via a parent I²C bus and a child I²C bus and using the I²C protocol, said bridge device comprising—a parent module arranged for connecting said parent I²C bus and comprising a parent I²C transmitter/receiver device and a parent module state machine, —a child module arranged for connecting said child I²C bus and comprising a child I²C transmitter/receiver device and a child module state machine, whereby said parent module and said child module each comprise an internal bridge interface to exchange messages between said parent module and said child module, said messages being generated by said parent module state machine or said child module state machine in response to a change of state caused by an event on their respective I²C buses, whereby said parent module and said child module are each arranged for translating an I²C event to a message and for forwarding said message to the module at the other side of the bridge device (Continued)

via said internal bridge interfaces, said module at the other side being arranged for further transmitting said message as an I²C event towards the I²C bus at the other side of the bridge device, and whereby said parent module and said child module are further each arranged for holding the communication towards the respective I²C bus by stretching a clock line on their respective I²C bus until a message, based on an event occurring on the I²C bus at the other side of the bridge device and instructing continuation of the communication, is received via said internal bridge interfaces from the module at the other side of the bridge device.

10 Claims, 9 Drawing Sheets

(58) Field of Classification Search
USPC .......................................................... 710/10
See application file for complete search history.

(56) References Cited

U.S. PATENT DOCUMENTS

| | | | |
|---|---|---|---|
| 2012/0072628 A1* | 3/2012 | Crockett | G06F 13/4291 710/110 |
| 2013/0124763 A1* | 5/2013 | Kessler | G06F 11/221 710/110 |
| 2016/0147684 A1* | 5/2016 | Sengoku | G06F 13/4282 710/105 |
| 2016/0232124 A1* | 8/2016 | Zheng | G06F 13/4291 |
| 2016/0350248 A1* | 12/2016 | Dionisio | G06F 13/404 |
| 2018/0260357 A1* | 9/2018 | Amon | G06F 13/364 |
| 2019/0077599 A1* | 3/2019 | Witt | G06Q 10/087 |
| 2019/0171611 A1* | 6/2019 | Mishra | G06F 13/4291 |
| 2020/0004708 A1* | 1/2020 | Zhou | G06F 13/4282 |
| 2020/0201804 A1* | 6/2020 | Graif | H04L 12/40143 |

* cited by examiner

IBIM(xxx) : Message from parent to child module (outgoing)
*IBIM(xxx): Message from child to parent module (incoming)*

I2C BRIDGE DEVICE

This application claims the benefit of European Application No. 16204429.1 filed Dec. 15, 2016 and PCT/EP2017/083003 filed Dec. 15, 2017, International Publication No. WO 2018/109160 A1, which are hereby incorporated by reference in their entirety as if fully set forth herein.

FIELD OF THE INVENTION

The present invention is generally related to the field of communication based on the I²C bus. More in particular, it relates to a bridge device for use in connection with such a bus.

BACKGROUND OF THE INVENTION

The use of I²C (inter-IC control) devices is very popular among designers of electronic systems because such devices offer an inexpensive way to provide distributed monitoring or control of a piece of equipment using a simple two wire serial communication bus. Inexpensive I²C devices are available to monitor voltage, temperature and other physical quantities, and provide non-volatile memory, parallel IO ports and a large variety of other specialized functions. Such devices are widely used in many types of electronic equipment from consumer electronics to computer systems.

Devices on an I²C bus act either as masters or as slaves. The master is always the device that drives the clock line. The slaves respond to the master. A slave device cannot initiate a transfer over the I²C bus, only a master can do that. Hence, both master and slave can transfer data over the I²C bus, but that transfer is always controlled by the master. There usually are multiple slaves on the I²C bus. However there is normally only one master, but it is possible to have multiple masters.

Communication over an I²C bus occurs over two wires, called SCL and SDA. The clock line SCL is used to synchronize all data transfers over the I²C bus. SDA is the data line. The SCL and SDA lines are connected to all devices on the I²C bus. There needs to be a third wire which is just the ground or 0 volt. There may also be a power supply wire to distribute power to the devices. Both SCL and SDA lines are "open drain" drivers, meaning that the chip can drive its output low, but it cannot drive it high. For the line to be able to go high pull-up resistors must be provided to the power supply wire. There should be a resistor from the SCL line to the power supply line and another from the SDA line to the power supply line. Only one set of pull-up resistors is needed for the whole I²C bus, not for each device.

Electronic systems are often designed with a central controller which communicates with peripheral devices. For low speed communication, the two-wire I²C protocol (as described e.g. in I²C bus Specification, Version 6.0, 4 Apr. 2014) is often used. There are, however, a number of problems and limitations related to the use of the I²C protocol.

Inherent to the I²C protocol is the limited address space: 7 bits are provided for the device address. Although 127 addresses exist, it often occurs that two devices share the same address, making it impossible for them to share the same bus. For the simplicity of the system though, or simply because the controller only has a single I²C bus master, it is desirable for all peripheral devices to be accessible through the same bus.

The I²C protocol does not specify voltage levels. Usually the I/O voltage at which a device operates, specifies the voltage levels that translate to a logical HIGH or LOW level. For example, in case a master uses 3.3V, it becomes impossible to connect a device which only expects 1.8V. In low-power designs though, devices are often powered with a voltage as low as possible in order to reduce power consumption. So in case not all devices share the same minimal voltage level, in order to achieve an optimal power consumption, they are likely to become I²C incompatible.

The I²C protocol clock SCL is specified to run at varying maximum frequencies, e.g. 100 kHz, 400 kHz, 1 MHz and 3.4 MHz. When connecting a multitude of devices, which do not all share the same maximum SCL frequency, to the same bus, the bus must operate at the lowest supported speed of all devices, in order for all of them to interpret the communication correctly. Any device must indeed be able to correctly interpret all communication on the bus it is connected to, for it to know it should leave the bus untouched or respond. Although I²C is intended mostly as a low-speed protocol, it is often desired to use a communication speed as high as possible for longer data transfers, e.g. for programming a memory device. For example, programming and verifying a 1 MBit EEPROM supporting 3.4 Mbit/s would take about 600 ms at its maximum speed, but once a 100 kbit/s device is added to the bus, it would take 20 seconds, which can make a system unusably slow.

In a communication system the controller and peripheral devices are not always physically connectable to the same I²C bus. When several PCBs are used, a high speed serial link can be used to allow communication between the PCBs. In such case, it is still desirable for the controller to use the same I²C protocol and bus for communication to I²C devices on-PCB as to I²C devices off-PCB.

U.S. Pat. No. 6,874,052 discloses an I²C bridge device which implements a communication protocol layered on top of a standard I²C protocol. The layered protocol used by the bridge device is named "Layered I²C Protocol" (LIP). The LIP bridge device provides I²C address space extension, data integrity checking and fault detection and isolation when inserted between an I²C bus master and its intended target I²C device. Each LIP bridge device has at least two attached I²C busses—a parent bus and a child bus. The LIP bridge operates as a slave on its parent bus, and a master of its child bus. The Layered I²C protocol is specified to operate on a bus between one or more bus masters and the parent bus of one or more LIP bridge devices. The child bus is used for attaching multiple I²C devices and/or one or more LIP bridge devices.

Hence, the communication between their master and bridge in U.S. Pat. No. 6,874,052 occurs through a custom protocol (LIP), which is a wrapper around an I²C message. The parent bus traffic to a given LIP bridge device consists entirely of LIP packets, and the child bus traffic consists of standard I²C packets to communicate with standard child bus I²C devices.

A major drawback of this approach is that the benefits of address space extension only come at the expense of a significant amount of overhead. For every single I²C event (Start, Stop, Byte) on the child bus, four I²C bytes need to be transferred on the parent bus. On top of this, these four bytes need to form an I²C sequence, i.e. be delimited by Start and Stop condition. When implementing on a CPU with a dedicated I²C core, each of those sequences needs to be initiated by the CPU, incurring more overhead, especially significant when the master wants to send a long I²C sequence to a slave device (e.g. programming an I²C memory device).

Another important drawback of the proposed solution in U.S. Pat. No. 6,874,052 is the non-transparency of the bridge. The I²C master device needs to be made aware of the bridge and specially programmed to be able to use it to talk to the I²C slaves on its child bus. Because of this, there is no direct acknowledgement mechanism (ACK'ing) as there usually is with a direct master-slave I²C link. The master can neither detect if the clock (or data) is being held low by a slave. The LIP approach works around this by giving access to a set of registers containing status data, which the I²C master needs to be programmed for.

I²C sequences become in fact asynchronous: where in regular I²C, receiving an ACK from the slave device is a means for the master to know the data was received, in the LIP approach, data from the master is acknowledged immediately by the bridge, before the data from the master is sent to the slave.

Another shortcoming of U.S. Pat. No. 6,874,052 is that a full bridge device which buffers data and addresses, would acknowledge to the master prior to knowing if the address or data are acknowledged on the slave side. This could leave the master with false information about the system and leave the system in a falsely assumed correct state.

Hence, there is a need for a bridge device that allows communication between a master device and a slave device that overcomes at least one or more of the above-mentioned problems.

SUMMARY OF THE INVENTION

It is an object of embodiments of the present invention to provide for a transparent bridge device for I²C communication.

The above objective is accomplished by the solution according to the present invention.

In a first aspect the invention relates to a bridge device operable between a master device and a slave device of a communication system, said master device and said slave device arranged for communicating with each other via a parent I²C bus and a child I²C bus and using the I²C protocol. The bridge device comprises
 a parent module arranged for connecting the parent I²C bus and comprising a parent I²C transmitter/receiver device and a parent module state machine,
 a child module arranged for connecting the child I²C bus and comprising a child I²C transmitter/receiver device and a child module state machine,
whereby the parent module and the child module each comprise an internal bridge interface to exchange messages between the parent module and the child module, said messages being generated by the parent module state machine or the child module state machine in response to a change of state caused by an event on their respective I²C buses,
whereby said parent module and said child module are each arranged for translating an I²C event to a message and for forwarding said message to the module at the other side of the bridge device via said internal bridge interfaces, said module at the other side being arranged for further transmitting said message as an I²C event towards the I²C bus at the other side of the bridge device, and
whereby said parent module and said child module are further each arranged for holding the communication towards the respective I²C bus by stretching a clock line on their respective I²C bus until a message, based on an event occurring on the I²C bus at the other side of the bridge device and instructing continuation of the communication, is received via said internal bridge interfaces from the module at the other side of the bridge device.

The proposed solution indeed allows for overcoming the above-mentioned problems and achieving more reliable communication. Due to the fact that each module can hold the communication towards the I²C bus it is connected to, while waiting for a notification by the other side that the communication can continue, the communication system is never left in a falsely assumed correct state. The main benefit of the proposed bridge device lies in its full transparency.

In a preferred embodiment the internal bridge interfaces of the parent module and the child module are connected via a bidirectional communication link. The bidirectional communication link then advantageously comprises in each direction a First-In-First-Out buffer. In certain embodiments the bidirectional communication link also contains an off-board link.

In a preferred embodiment the child module is arranged for connecting a plurality of child I²C busses. In one embodiment the child module then comprises an address-to-I²C child bus index table, said table comprising a list of the various I²C busses that are available.

In a preferred embodiment the message is caused by either an I²C start condition followed by an I²C device address, an I²C stop condition, an I²C acknowledge, an I²C not-acknowledge or an I²C byte.

In an embodiment the bridge device of the invention is implemented using a field-programmable gate array, a complex programmable logic device or an application specific integrated circuit.

In another embodiment the parent module comprises a digital input pin on which an external pulse can trigger the transmission of an error message to the child module and wherein the child module comprises a digital output pin to generate a pulse in response to receipt of the error message.

In another aspect the invention relates to a communication system comprising at least one master device, at least one slave device and a bridge device as in any of the previous claims, wherein said at least one master device and said at least one slave device are arranged for communicating with each other via a parent I²C bus and a child I²C bus and using the I²C protocol.

For purposes of summarizing the invention and the advantages achieved over the prior art, certain objects and advantages of the invention have been described herein above. Of course, it is to be understood that not necessarily all such objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

The above and other aspects of the invention will be apparent from and elucidated with reference to the embodiment(s) described hereinafter.

BRIEF DESCRIPTION OF THE DRAWINGS

The invention will now be described further, by way of example, with reference to the accompanying drawings, wherein like reference numerals refer to like elements in the various figures.

DETAILED DESCRIPTION OF ILLUSTRATIVE EMBODIMENTS

Figure 1:
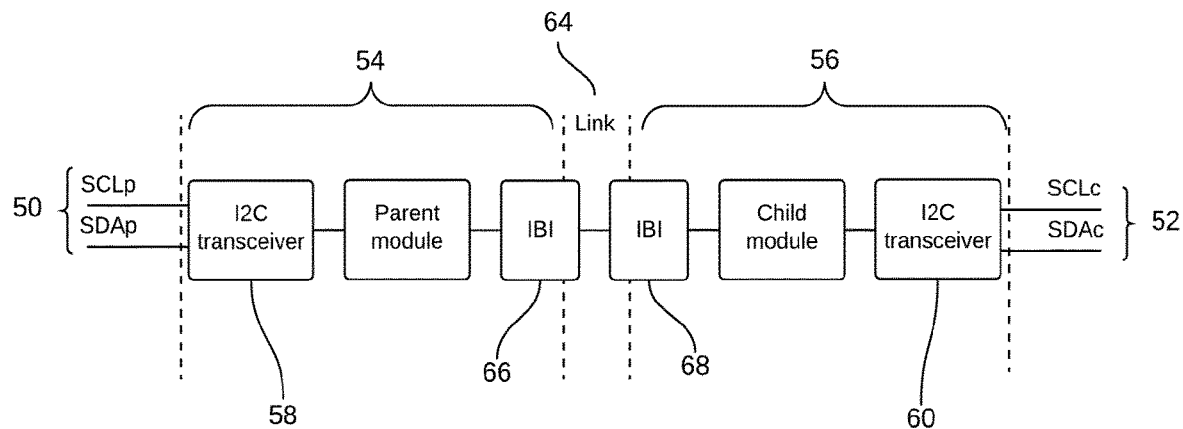
FIG. 1 shows a high-level overview of the bridge device of the invention.

The present invention will be described with respect to particular embodiments and with reference to certain drawings but the invention is not limited thereto but only by the claims.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

It should be noted that the use of particular terminology when describing certain features or aspects of the invention should not be taken to imply that the terminology is being re-defined herein to be restricted to include any specific characteristics of the features or aspects of the invention with which that terminology is associated.

In the description provided herein, numerous specific details are set forth. However, it is understood that embodiments of the invention may be practiced without these specific details. In other instances, well-known methods, structures and techniques have not been shown in detail in order not to obscure an understanding of this description.

The present invention proposes a digital bridge device for use in a communication scheme which is fully transparent to all I²C host and slave devices. The transparent byte-level bridge joins at least two I²C buses, with at least one parent bus where an I²C master lives and at least one child bus where an I²C slave lives. The bridge operates as an I²C slave on the parent bus and as an I²C master on the child bus. Bridge messages are used to transfer I²C events and data internally between the bridge ends. Clock stretching is used to hold an I²C bus for which the bridge is awaiting a response, as detailed below. Neither any master nor slave device has to be adjusted to work with the bridge. Neither any master nor slave device is able to detect presence of the bridge device.

The bridge according to the invention buffers a single I²C byte (if preceded by an I²C start condition, this is the I²C slave device address) from the master and holds the communication on the master side by stretching SCLp (i.e. the clock line at the parent side) until the bridge has received a response from the slave side. The same can happen in the opposite direction: a single I²C byte from a slave device is buffered and holds the communication on the slave side by stretching SCLc (i.e. the clock line at the child side) until the bridge has received a response from the master side. Given that the first I²C byte following a start condition contains the I²C slave device address, the bridge can operate as a router: a parent module linked with multiple child modules can choose to which child module it will route the I²C sequence. Similarly, a child module with multiple child I²C buses can choose to which child I²C bus to route the I²C sequence. The bridge device of this invention is fully transparent to both master device and slave device. Throughout the whole communication, neither the master or slave side needs to obey other than standard I²C protocol specifications. The proposed bridge does not have as much overhead as in U.S. Pat. No. 6,874,052 and is not affected by the complication that an acknowledgement is sent to the master before one knows there has been an acknowledgement at the slave side.

A high-level scheme of an embodiment of the bridge is shown in FIG. 1. A parent I²C bus 50 is connected to the bridge via an I²C transmitter/receiver device (transceiver) 58 of a parent module 54 and a child I²C bus 52 is connected via an I²C transceiver 60 of a child module 56. The modules form two logical parts of the bridge device. Each I²C transceiver is in this embodiment connected to a corresponding state machine. A state machine can be seen as a controller. The state machines of the two modules are connected via Internal Bridge Interfaces (IBIs) (66,68), with a bidirectional communication link 64 in between. The IBIS and link in between thus connect the parent and the child side of the bridge. The implementation of this link can take different forms, e.g. a Gigabit rate coaxial full duplex link, possibly also accommodating other data streams. The bridge thus comprises a parent module with a parent I²C transceiver to connect a parent I²C bus, a child module with a child I²C transceiver to connect a child I²C bus and is arranged for exchanging messages between the modules using internal bridge interfaces.

Figure 2:
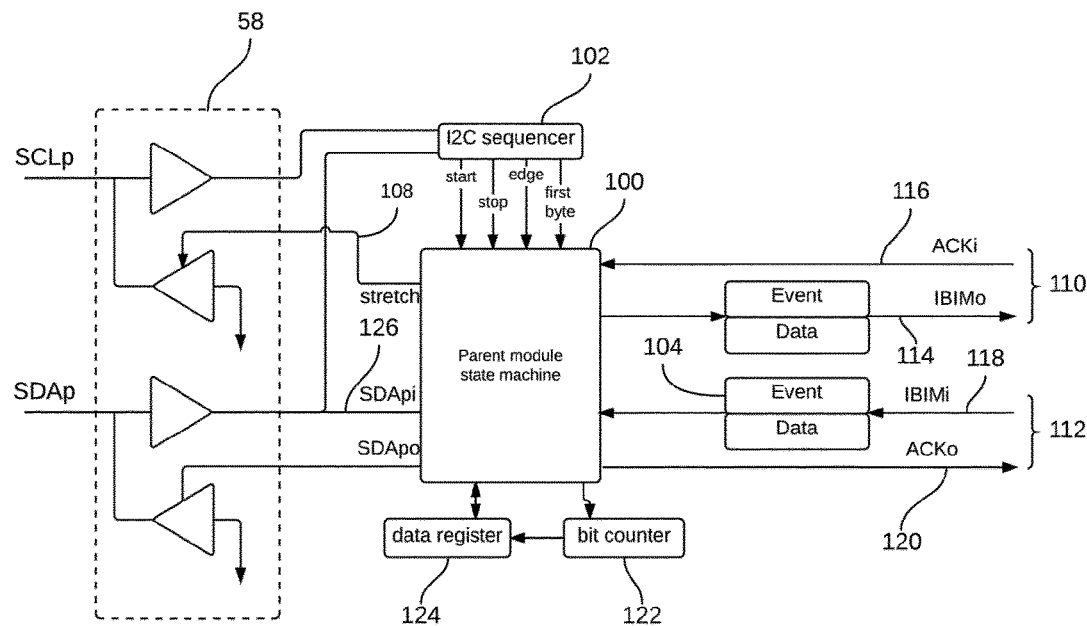
FIG. 2 illustrates internal details of the parent module.

In the state machine 100 of the parent module (see FIG. 2) the state transitions are either
- driven by events occurring on the parent I²C bus, detected by the I²C sequencer 102, when the bus direction is from master to slave, combined with the state of the bit counter 122 and the state of SDApi 126, or
- driven by incoming messages 104 received via the link when the bus direction is from slave to master.

All communication on the parent I²C bus (clock line SCLp and data SDAp) is listened to using the I²C transceiver 58 in the parent module. The master device can be made waiting by keeping SCLp low while waiting for an answer from the child side, using the stretch line 108. The state machine is protocol aware and ensures correctness of communication.

Figure 3:
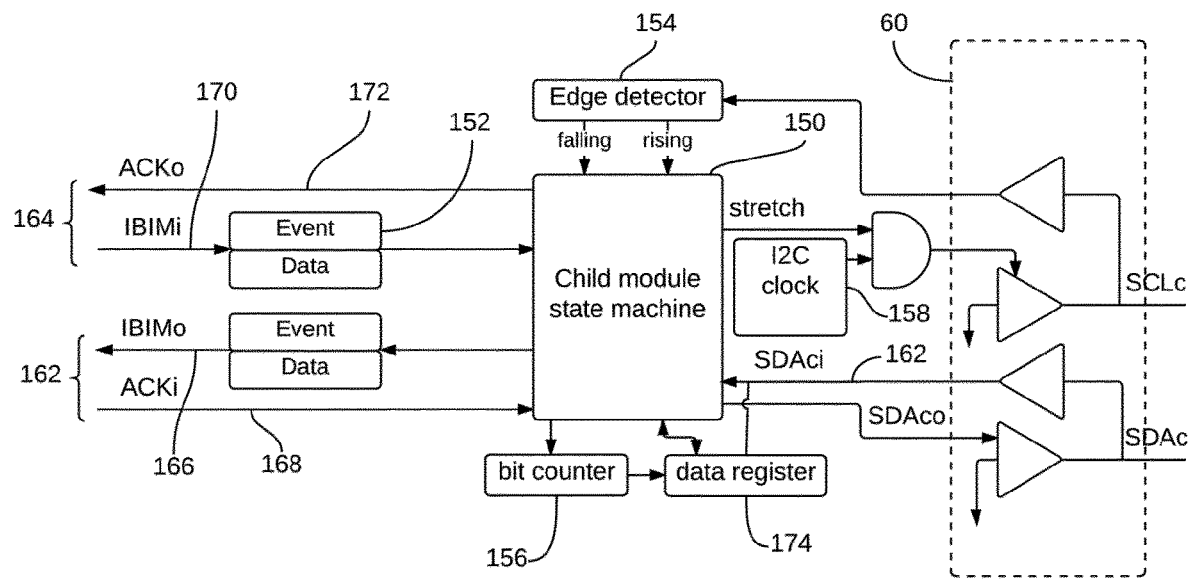
FIG. 3 illustrates internal details of the child module.

In the state machine 150 of the child module (see FIG. 3) the state transitions are either
- driven by incoming messages 152 received via the link when the bus direction is from master to slave or
- driven by events occurring on the child I²C bus, detected by the edge detector 154, combined with the state of the bit counter 156 and the state of SDAci 162, when the bus direction is from slave to master At the child side the I²C communication on the child I²C bus (SCLc/SDAc) is repeated using the I²C transceiver 60 of the child module. Since the child module can be separated from the parent module, it must generate SCL by itself, using an I²C clock generator 158. The module listens to the activity on the child I²C bus to generate responses for the parent side of the bridge.

The state machines of the two modules of the bridge present outgoing messages to the link using an outgoing Internal Bridge Interface (110, 162). This comprises an outgoing Internal Bridge Message IBIMo (114, 166) and an incoming ACK flag ACKi (116, 168). The state machines accept incoming messages from the link via an incoming Internal Bridge Interface (112, 164). This comprises an incoming Internal Bridge Message IBIMi (118, 170), and an outgoing ACK flag ACKo (120, 172). The combination of IBIMo, ACKi, IBIMi and ACKo is called an IBI. When two modules IBIS are connected to one another, a link is formed between the modules. The modules do not have to be directly connected though. As long as IBIMs can travel from one module's IBI to another one's IBI and vice versa, there is a link.

Figure 4:
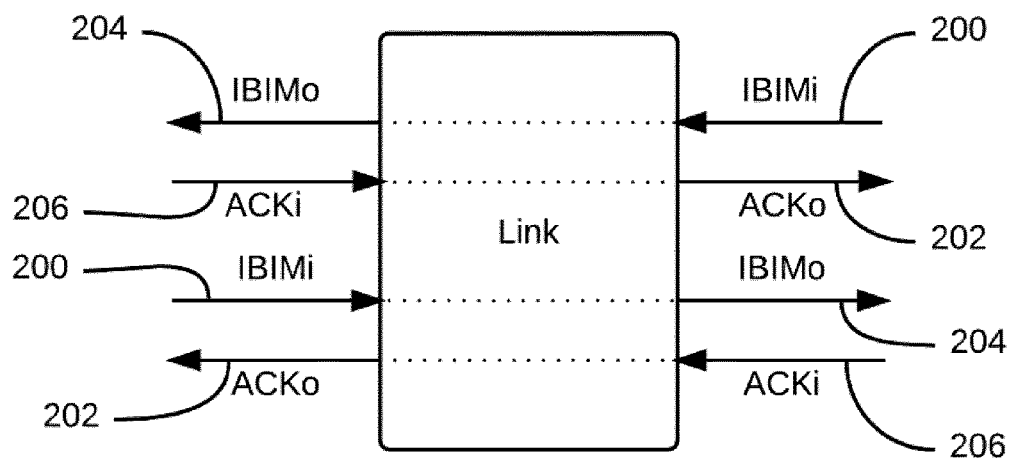
FIG. 4 illustrates a general schematic of a link.

On one end of the link shown in FIG. 4, the link listens for an incoming Internal Bridge Interface Message on the IBIMi line 200 from a module and when the link has the capacity to accept the message, it asserts the ACKo flag 202 for one clock cycle to notify the module it can present the next message. On the other end of the link, the opposite happens: the other module listens for an outgoing Internal Bridge Message on the IBIMo line 204, and when the latter module is ready to accept the message, the module asserts the ACK flag 206 for one clock cycle to notify the link it can present the next message. Since link-to-module and module-to-link are identical paths, the modules can be connected immediately, i.e. connecting one module's IBIMo to the other module's IBIMi and vice versa, as well connecting one module's ACKo to the other module's ACK.

Figure 5:
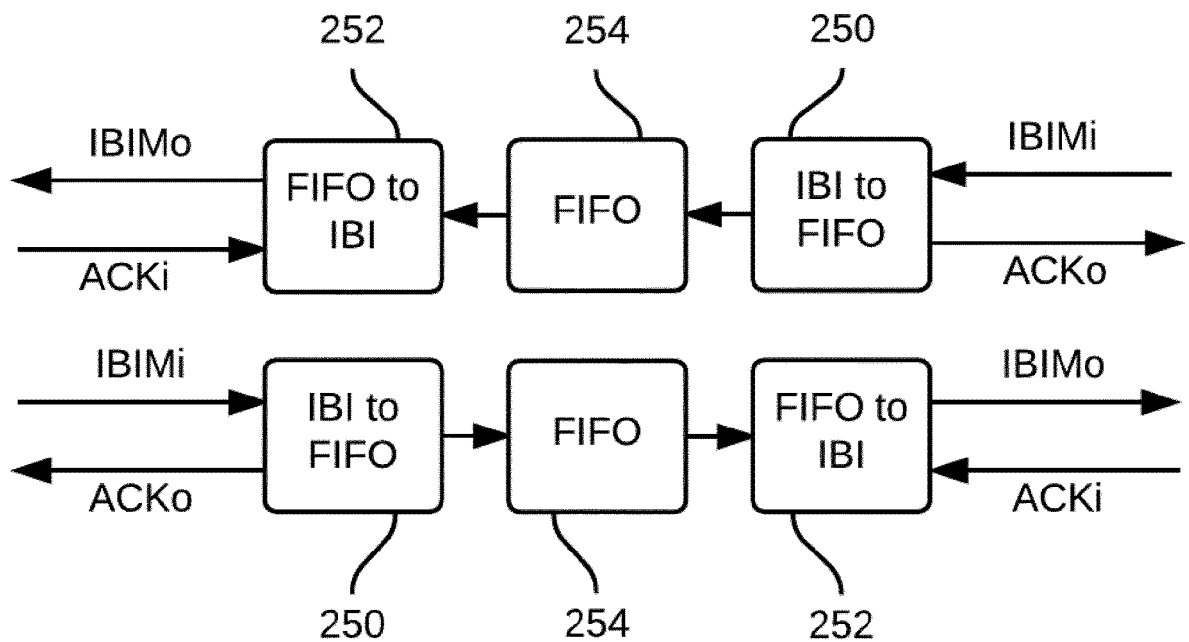
FIG. 5 illustrates a schematic implementation of a bridge link with two FIFO buffers.

In a more complex form, where the parent and child module cannot share a clock, the link can take the form of two opposite direction FIFO buffers with an IBI-to-FIFO 250 and FIFO-to-IBI 252 interface on each end of each FIFO 254, as illustrated in FIG. 5. In an even more complex form, the link can also contain an off-board link, eventually allowing and I²C master on board A to communicate with an I²C slave on board B.

The I²C transceiver of the parent module can be considered a virtual I²C slave, representing all I²C slave devices on the other side of the bridge device. The I²C transceiver of the child module can be considered a virtual I²C master, representing all I²C masters which have access to the child module.

Figure 6:
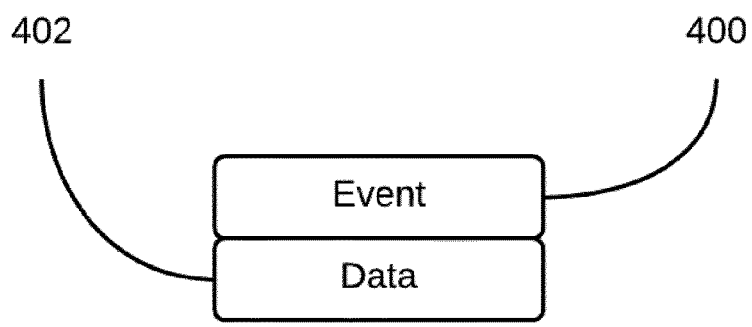
FIG. 6 illustrates the bridge internal message (IBIM).

The exchange of messages between a module and the link or, possibly, between the two modules directly, is done using an Internal Bridge Interface (IBI). Such an Internal Bridge Interface message 16 comprises an I²C event field 400 and an optional data byte field 402 (see FIG. 6). As shown in Table 1, seven events exist:

TABLE 1

| Event | Data byte | Description | Direction |
|---|---|---|---|
| NOP | ignored | Indicates no message is available on the IBI. | Both |
| START | Device address + R/W bit following start condition | A start condition occurred. The data byte is the byte the master sent out immediately following the start condition. This typically represents the I²C slave device address and a bit indicating if a read or write operation will follow. | Master > Slave |

TABLE 1-continued

| Event | Data byte | Description | Direction |
| --- | --- | --- | --- |
| STOP | ignored | Indicates a STOP condition occurred | Master > Slave |
| ACK | ignored | An ACK condition occurred on the I²C bus | Both |
| NACK | ignored | A NACK condition occurred on the I²C bus | Both |
| DATA | Data | A byte was received | Both |
| ERROR | ignored | An error occurred | Both |

The meaning of a message is always the same. However, the way it is handled depends on the state of the module state machine. For brevity and ease of reading, a short-hand notation is introduced: An Internal Bridge Interface Message with an event E and data byte B is denoted as IBIM{E,B}. In case of an event for which the data byte is ignored or irrelevant, the notation becomes IBIM{E}.

Figure 7:
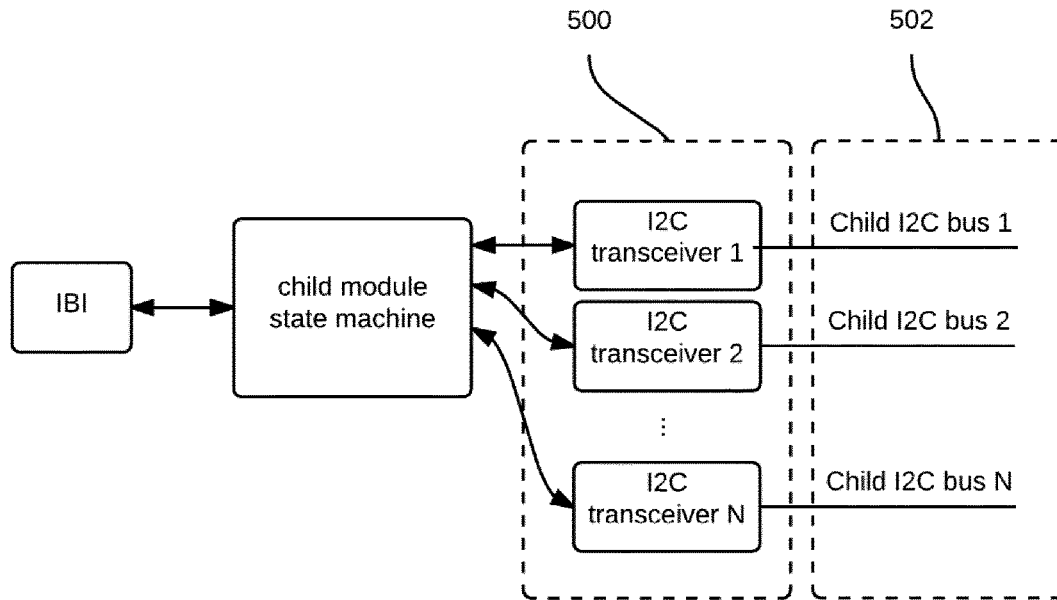
FIG. 7 illustrates a child module with multiple child I²C buses.

Every I²C transaction begins with a START condition and an address byte, which translates to a START message with that same address byte. A child module can be modified to have multiple I²C transceivers 500, providing access to different child I²C buses 502 as illustrated in FIG. 7. When IBIM{START, address} reaches the child module, it can then choose which child I²C bus to forward this I²C transaction to, based on the address. The child module then continues to use the same I²C child bus for forwarding messages to until another START message arrives. At that point, the child module again chooses which child I²C bus is used based on the address byte in the last received IBIM.

In the case where two I²C slave devices with the same address X exist in a system, they can be placed on two separate child buses connected to the child module, as described above. The child module can then translate a first address A received from a master module to that I²C slave address X and first child bus and a second address B received from a master module to the that same I²C slave address X and second child bus. A and B must be different, but A or B can be equal to X (see first two lines in Table 8).

Figure 8:
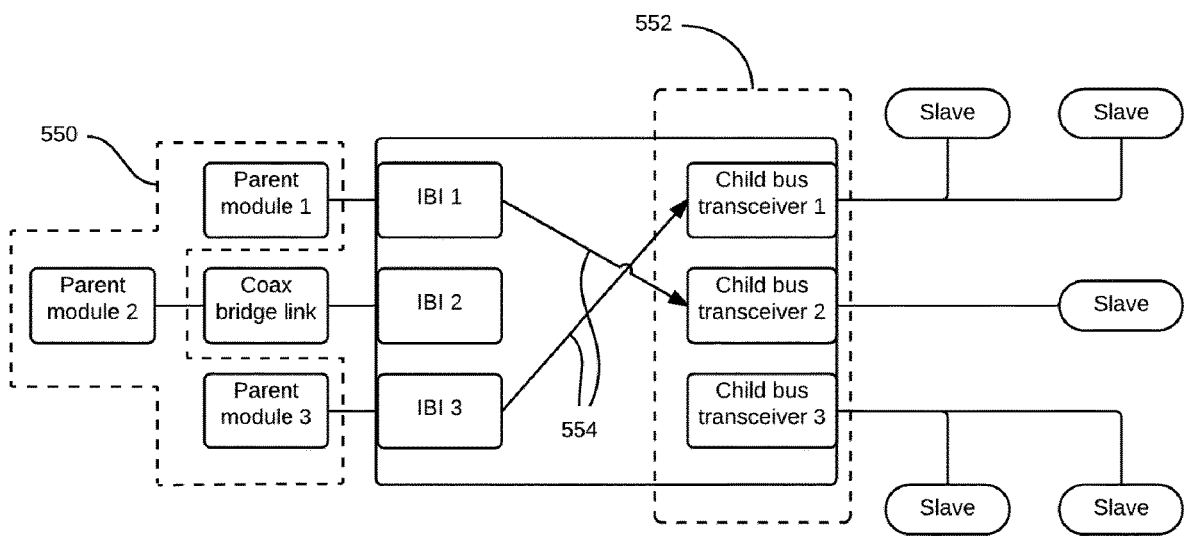
FIG. 8 illustrates a child module with built-in multiplexer, connecting several parent modules to multiple I²C child buses.

Because an I²C transaction is delimited by a START and STOP condition, which translates to a START and STOP message in terms of IBI, one can delimit a time slot in which a parent module controls a child module. This can be used in a so-called module multiplexer (illustrated in FIG. 8), which connects a multitude of parent modules 550 to a multitude of child I²C buses 552. In such configuration, when different parent modules need access to different child I²C buses, these accesses can overlap in time, as suggested by the lines 554.

Figure 9:
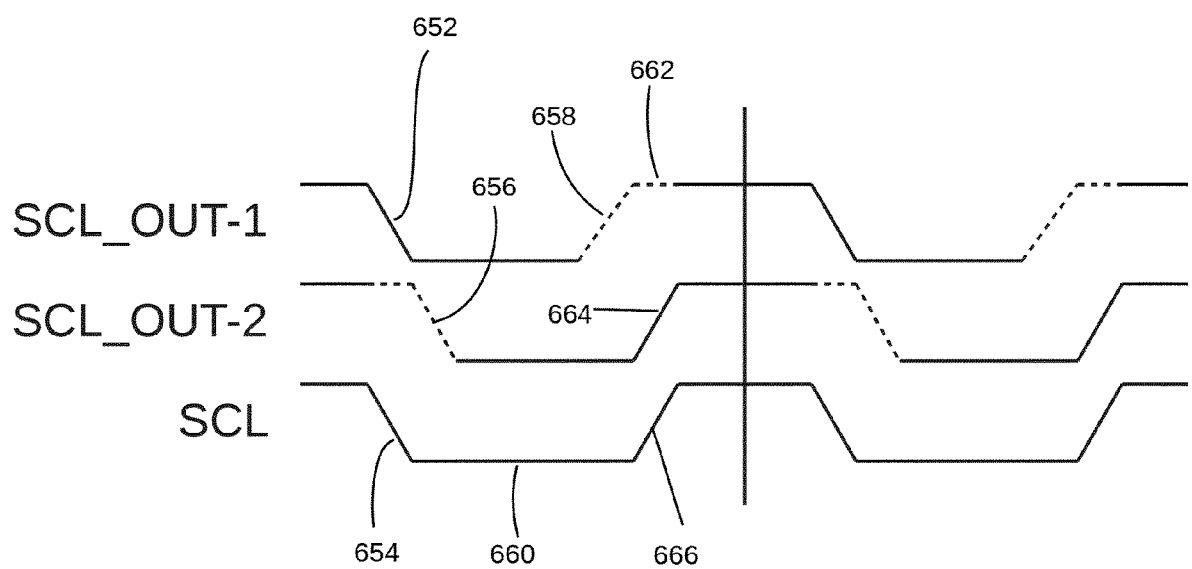
FIG. 9 illustrates clock stretching.

Now the principle of clock stretching is explained. FIG. 9 shows a timing diagram illustrating clock-stretching. The timing diagram shows three representative waveforms: SCL_OUT-1 representing the driver output of the clock line of a first device; SCL_OUT-2 representing the driver output of the clock line of a second device; and SCL representing the actual signal that appears on the SCL clock line of an I²C-bus. The SCL signal represents the actual logic value on the line after the Wired-AND function—this is also the value read by the input buffer of all devices. Where either of the output buffer values differ from the resolved. SCL value, this is represented by a dotted line. The sequence in the timing diagram of FIG. 9 is as follows:

652: SCL_OUT-1 goes low as the first device initiates a bit transfer by pulling down the clock line;
654: SCL goes low because any driver applying a logic-zero to the bus will cause the low to be reflected on the line;
656: SCL_OUT-2 goes low as the second device sees SCL go low and also wants to arbitrate for bus ownership so it also pulls its driver low. This is where the second device begins clock stretching.
658: SCL_OUT-1 goes high as the first device is ready and releases its output driver;
660: SCL will stay low until the second device is released;
662: SCL_OUT-1 stays high as the first device now has to enter a wait-state until it sees SCL go high through its input buffer;
664: SCL_OUT-2 goes high as the second device is ready and releases its output driver. This is where the second device ends clock stretching.
666: SCL goes high because both SCL_OUT-1 and SCL_OUT-2 are high.

The sequence may then repeat. Through this method a slower device on the bus may keep pace with the transmission by limiting stopping (holding) the clock SCL until it is ready to respond appropriately. It must be noted that if the end of the clock stretching falls before or at 658, the point where the first device is ready and releases its output driver, no clock stretching is noticeable on SCL, though internally it might still be occurring.

The invention is now further explained in technical detail taking as example an I²C write sequence.

Example A: An I²C Write Sequence

Figure 10:
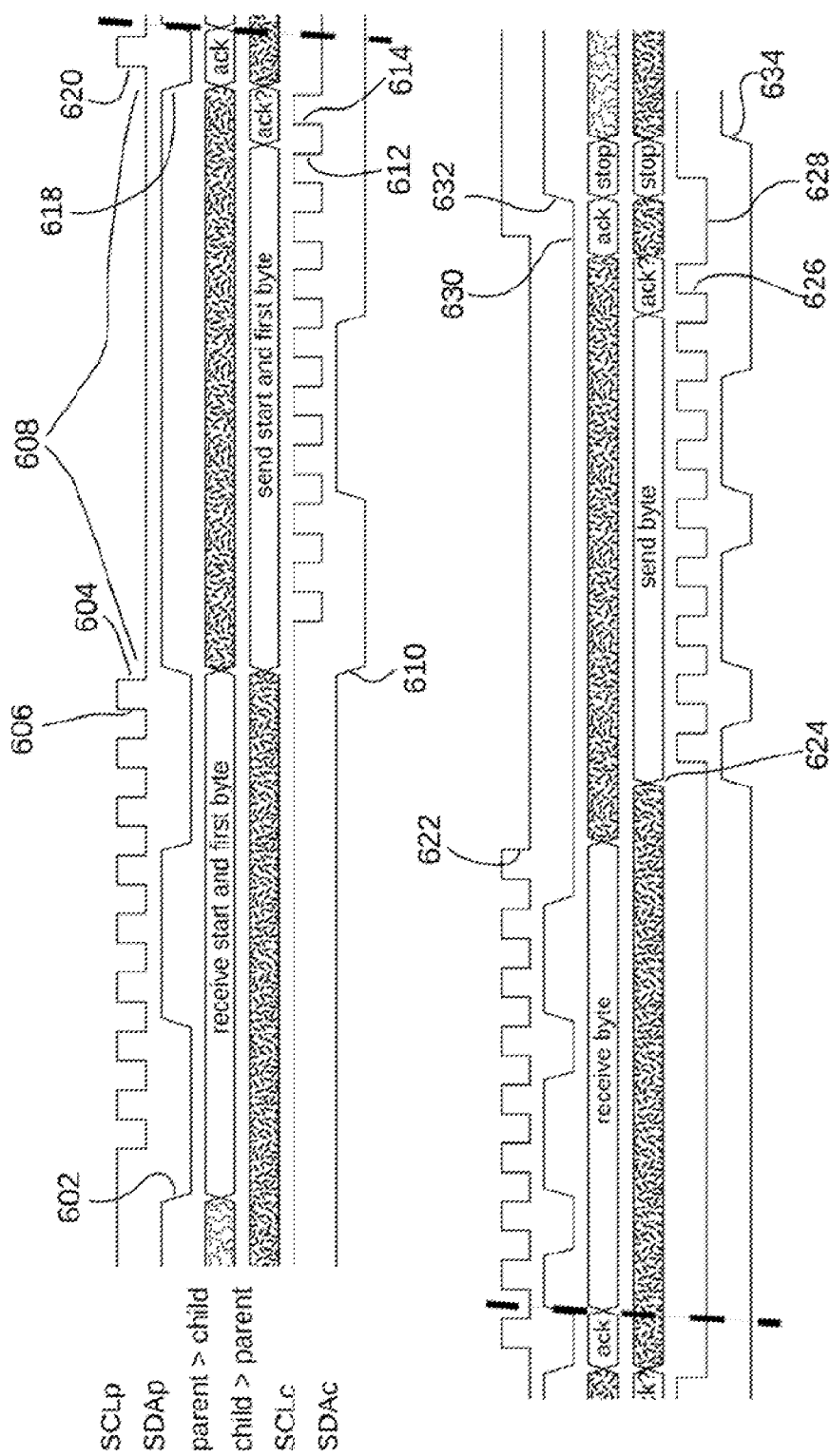
FIG. 10 illustrates the timing of the I²C signals on the parent and child bus, along with the IBIM that are sent from parent to child module and from child to parent module.

Applied to the bridge of this invention, clock stretching in a single-byte write is now considered. Reference is made to FIG. 10. Initially, both the parent I²C bus and child I²C bus are idle, the parent module is listening (indicated with non-bold filling in FIG. 10) and child module is waiting for a command from the parent module (indicated with bold filling).

Figure 11:
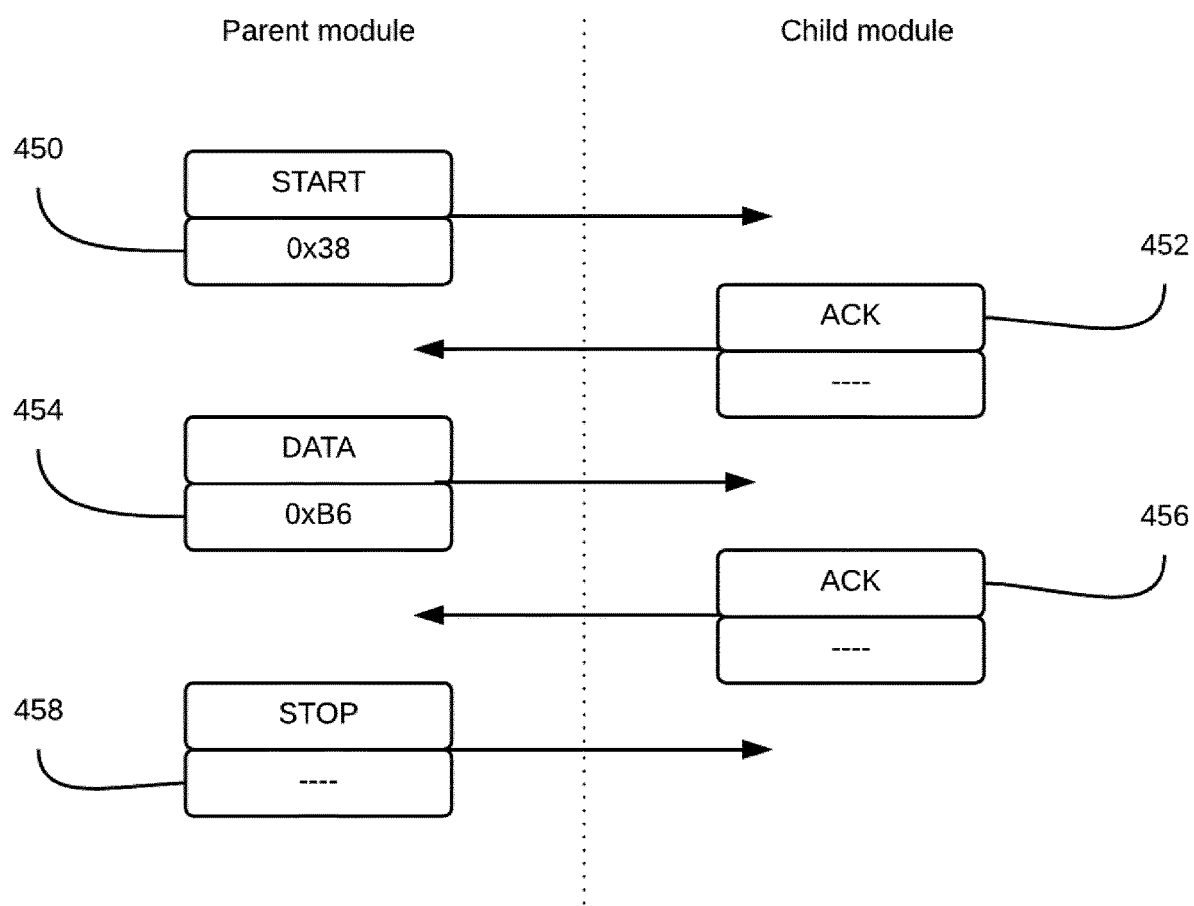
FIG. 11 illustrates the exchanged IBIMs in a single-byte I²C write sequence.

At 602 an I²C start condition occurs. At 604, an I²C start condition has occurred followed by 8 bits incorporating the device address (here 0x1C, or 0x38 if the R/W bit is considered as an address bit) as well as whether the master wants to perform a read or write operation (here write, since SDA is '0' at the 8th rising SCL of the parent I²C bus 606). This results in an IBIM{START, 0x38} (450) to be presented to the link (see FIG. 11).

The master device which initiated the I²C operation on the parent bus now checks for an acknowledgement from the slave device. In the I²C protocol an acknowledgement is represented by the slave holding SDA low during the next rising edge on SCL. Because the bridge still needs to repeat the I²C start condition and byte it just received on the child bus side, the parent module cannot yet give an appropriate "acknowledge" (ACK) or "not acknowledge" (NACK). The parent module thus makes the master wait by holding SCLp low 608.

At 610 the child module has received the IBIM message and in turn produces a START condition on the child bus, followed by the device address.

At 612 the child module releases SDA to read its state on the 9th rising edge 614 of SCLc of the child I²C bus. In this case SDAc is low, so the child module presents IBIM{ACK} (452) to the link. If it were high, it would present IBIM{NACK}. After receiving the ACK on the child I²C bus, the child module keeps SCLp low to hold the child I²C bus while the child module awaits the next event from the link.

At 618 the parent module has received IBIM{ACK} from the link and translates the received message to the parent bus by pulling SDAp low. It then releases SCLp 620 of the parent bus, so the master can continue the I²C sequence. Once the master has received the ACK signal, the parent module continues to receive the next byte.

At 622, after 8 rising edges of SCL, the parent module once again makes the master wait by stretching the clock as it presents IBIM{DATA, 0xB6} (454) to the link.

At 624 the child module has received the IBIM{DATA, 0xB6}. It releases SCL and continues to generate a clock signal on SCLc, while sending the 8 data bits onto the child bus and receives the slave's ACK/NACK at 626. This results in the child bus being held (SCLc pulled low, 628) and an IBIM{ACK/NACK} (456) presented to the link, which results in an ACK/NACK to appear on the parent bus 630.

At 632, the master generates a STOP condition, which makes the parent module send IBIM{STOP} (458) to the link. The parent module then becomes idle. When the child module received IBIM{STOP}, this condition is repeated on the child bus 634. The child module is now again in the same IDLE state as it was before the start condition.

Figure 12:
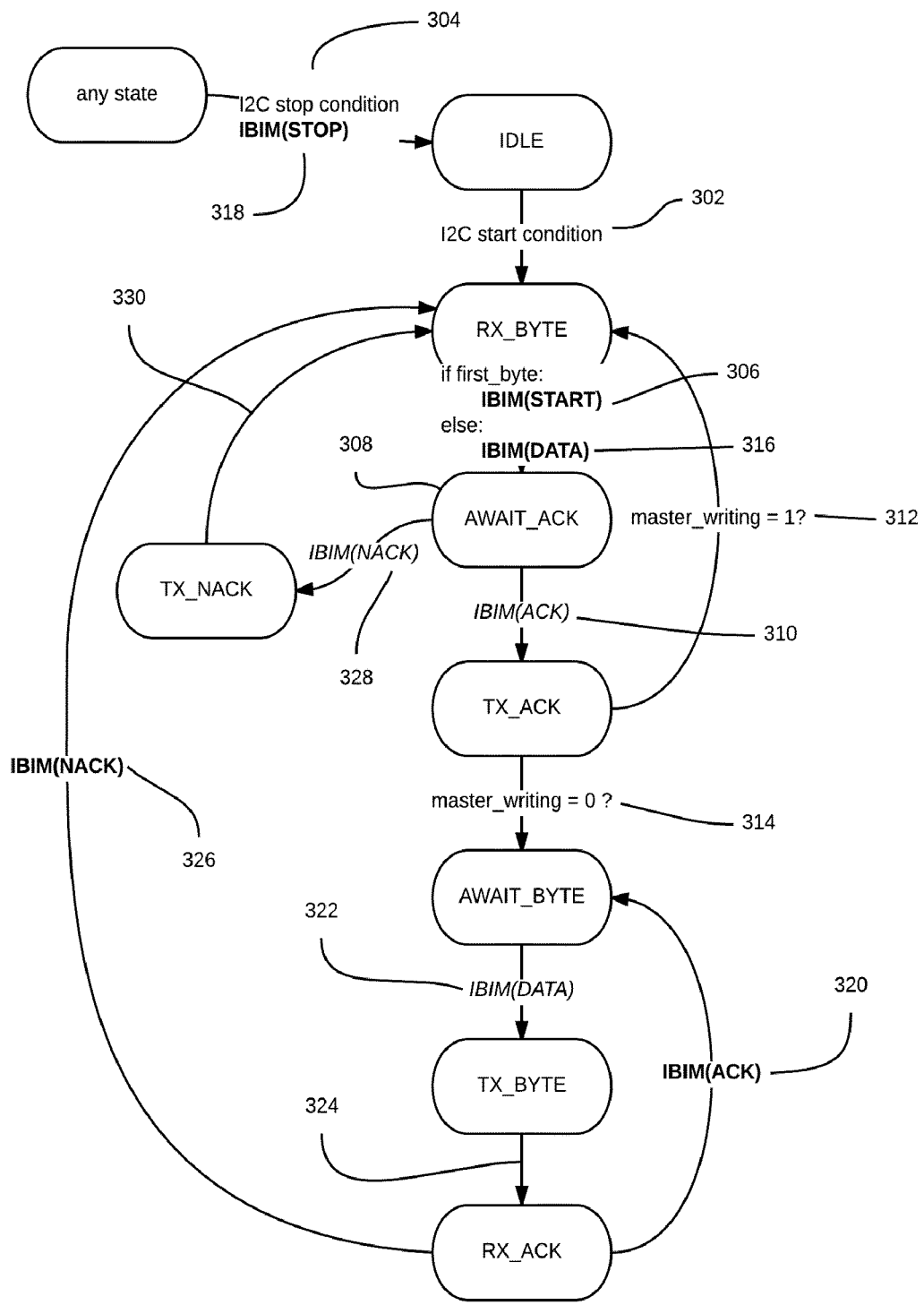
FIG. 12 illustrates the parent module state machine and its transitions.

The parent module has a state machine with 8 states (see FIG. 12): IDLE, RX_BYTE, AWAIT_ACK, TX_ACK, TX_NACK, AWAIT_BYTE, TX_BYTE, RX_ACK. From any state, if a start condition occurs, the state machine is forced to the RX_BYTE state 302. From any state, if a stop condition occurs, the state machine is forced to the IDLE state 304. Below is a state transition table. The state machine in the parent module is designed so that IBIMs for the link are generated upon state departure. For clarity, states where the state machine is waiting for a message from the link, have names starting with AWAIT. States, departure from which depends on an event on the parent I²C bus, have names starting with TX or RX (except for IDLE).

TABLE 2

| State | Event | Next state | IBIM for link | SCLp being held |
|---|---|---|---|---|
| IDLE | Start condition | RX_BYTE | | No |
| RX_BYTE | 8 bits received and first byte of sequence[3] | AWAIT_ACK | START + byte | No |
| RX_BYTE | 8 bits received and not first byte of sequence[3] | AWAIT_ACK | DATA + byte | No |
| AWAIT_ACK | IBIM from link = ACK | TX_ACK | | Yes |
| AWAIT_ACK | IBIM from link = NACK | TX_NACK | | Yes |
| TX_ACK | 1 SCLp cycles occurred and master is writing[1] | RX_BYTE | | No |
| TX_ACK | 1 SCLp cycle occurred and master is reading[1] | AWAIT_BYTE | | No |
| TX_NACK | 1 SCLp cycle occurred | RX_BYTE[2] | | No |
| AWAIT_BYTE | IBIM from link = DATA | TX_BYTE | | Yes |
| TX_BYTE | 8 SCLp cycles occurred | RX_ACK | | No |
| RX_ACK | SDAp was '0' at a falling edge of SCLp | AWAIT_BYTE | ACK | No |
| RX_ACK | SDAp was '1' at a falling edge of SCLp | RX_BYTE[2] | NACK | No |
| Any state except IDLE | Stop condition | IDLE | STOP | |

Some further comments to Table 2 need to be provided with respect to the reference numbers indicated in the table:

[1]The state machine keeps track if the master device is writing by registering the LSB of the byte received after the last start condition.

[2]The next state is not IDLE itself, since a STOP condition only results in an IBIM STOP message when the state is any but IDLE.

Some further comments to Table 2 need to be provided with respect to the reference numbers indicated in the table:

[1] The state machine keeps track if the master device is writing by registering the LSB of the byte received after the last start condition.

[2] The next state is not IDLE itself, since a STOP condition only results in an IBIM STOP message when the state is any but IDLE.

[3] Every time a START condition occurs on the parent bus, a first-byte register is set to '1'. Upon leaving RX_BYTE, this register is reset to '0'.

[4] Upon entry of the RX_BYTE state, a bit counter is reset. The counter increments for every rising edge on SCLp, and is used to index the DATA register in which the value of SDAp is stored, in the clock cycle when SCLp rises.

Figure 13:
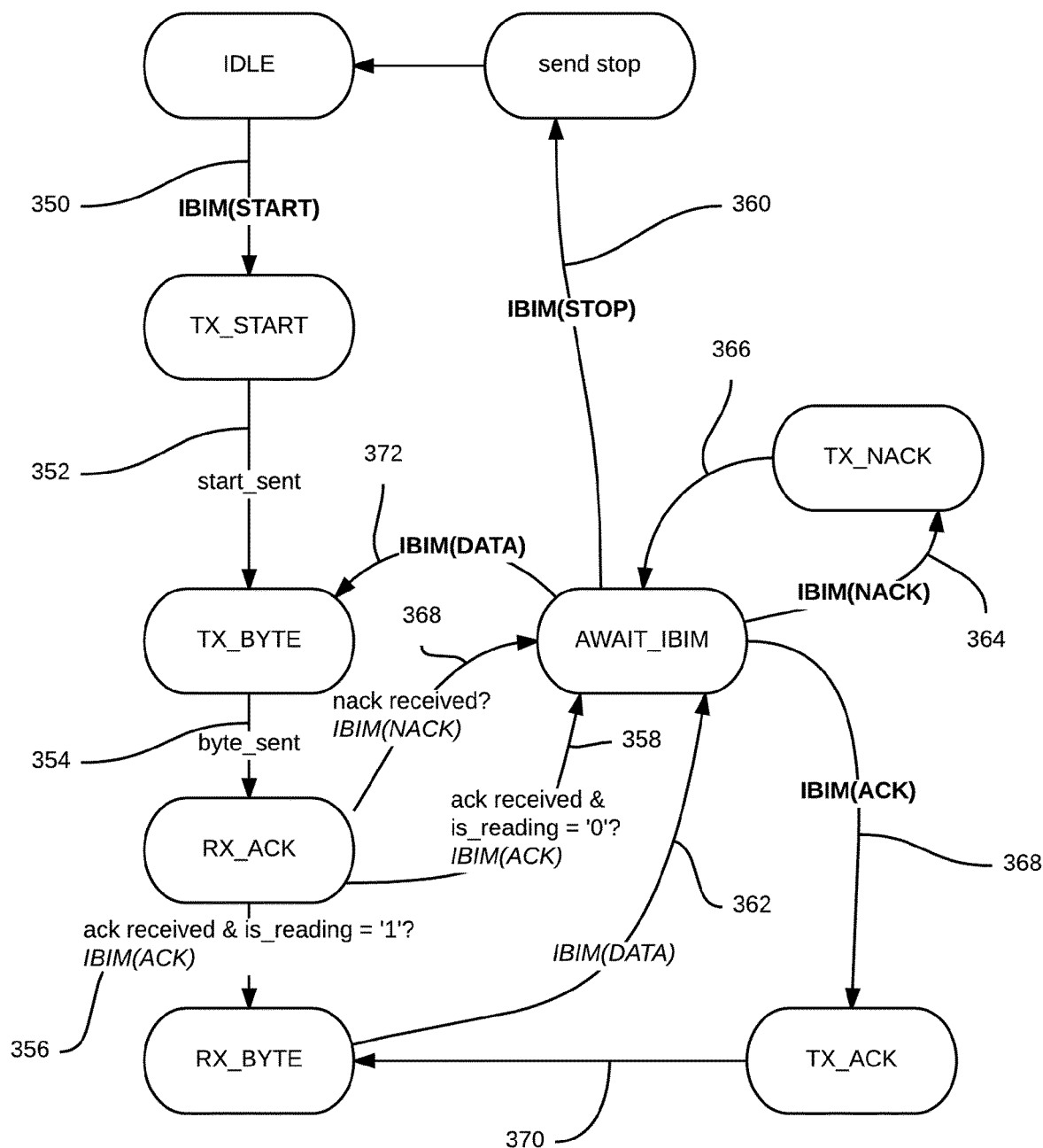
FIG. 13 illustrates the child module state machine and its transitions.

The state machine in the child module has nine states, as illustrated in FIG. 13. These states are: IDLE, TX_START, TX_BYTE, AWAIT_IBIM, RX_ACK, RX_BYTE, TX_ACK, TX_NACK, TX_STOP. Below is its state transition table. As in the parent module state machine, IBIM messages for the link are generated upon state departure. For uniformity, the state where the state machine is waiting for a message from the link, starts with AWAIT. States departure from which depends on an event on the parent I²C bus, have names starting with TX or RX (except for IDLE).

TABLE 3

| State | Event | Next state | IBIM for link | SCLc being held |
|---|---|---|---|---|
| IDLE | IBIM START | TX_START | | Yes |
| TX_START[1] | I²C transceiver sent start sequence | TX_BYTE | | No |
| TX_BYTE | I²C transceiver sent 8 bits (8 pulses of SCLc) | RX_ACK | | No |
| RX_ACK | SDAc is '0' when SCLc falls and master is writing[1] | AWAIT_IBIM | ACK | No |
| RX_ACK | SDAc is '0' when SCLc falls and master is reading[1] | RX_BYTE | ACK | No |
| RX_ACK | SDAc is '1' when SCLc falls | AWAIT_IBIM | NACK | No |
| RX_BYTE | I²C transceiver received 8 bits (to form the data byte) | AWAIT_IBIM | DATA + received data byte | No |
| TX_ACK | 1 SCLc cycle occurred | RX_BYTE | | No |
| TX_NACK | 1 SCLc cycle occurred | AWAIT_IBIM | | No |
| TX_STOP | I²C transceiver sent stop sequence | IDLE | | No |
| AWAIT_IBIM | IBIM = START | TX_START | | Yes |
| AWAIT_IBIM | IBIM = STOP | TX_STOP | | Yes |
| AWAIT_IBIM | IBIM = DATA | TX_BYTE | | Yes |
| AWAIT_IBIM | IBIM = ACK | TX_ACK | | Yes |
| AWAIT_IBIM | IBIM = NACK | TX_NACK | | Yes |

Further comment related to reference number 1 in Table 3:
[1] In the TX_START state the module registers if the following seuence is an I²C read or write, based on the LSB of the data byte in the IBIM, to know if it should move to the AWAIT_IBIM or RX_BYTE state when in the RX_ACK state.

A table clarifying the sequence of events and state transitions and the interaction between parent module and child module is given below for this example of an I²C single-byte write.

TABLE 4

| | Parent I²C bus | Parent module state | Link msg | Child module state | Child I²C bus |
|---|---|---|---|---|---|
| 0 | Idle | IDLE | NOP | IDLE | Idle |
| 1 | Start condition | IDLE | NOP | IDLE | Idle |
| 2 | Address bits | RX_BYTE | NOP | IDLE | Idle |
| 3 | Module stretching | AWAIT_ACK | > START > | IDLE | Idle |
| 4 | Module stretching | AWAIT_ACK | NOP | TX_START | Start condition |
| 5 | Module stretching | AWAIT_ACK | NOP | TX_BYTE | Address bits |
| 6 | Module stretching | AWAIT_ACK | NOP | RX_ACK | ACK |
| 7 | Module stretching | AWAIT_ACK | < ACK < | AWAIT_IBIM | Module stretching |
| 8 | Sending ack | TX_ACK | NOP | AWAIT_IBIM | Module stretching |
| 9 | Data byte | RX_BYTE | NOP | AWAIT_IBIM | Module stretching |
| 10 | Module stretching | AWAIT_ACK | > DATA > | AWAIT_IBIM | Module stretching |
| 11 | Module stretching | AWAIT_ACK | NOP | TX_BYTE | Data byte |
| 12 | Module stretching | AWAIT_ACK | NOP | RX_ACK | ACK |
| 13 | Module stretching | AWAIT_ACK | < ACK < | AWAIT_IBIM | Module stretching |
| 14 | Sending ACK | TX_ACK | NOP | AWAIT_IBIM | Module stretching |
| 15 | Stop condition | IDLE | > STOP > | AWAIT_IBIM | Module stretching |
| 16 | Idle | IDLE | NOP | SEND_STOP | Stop condition |
| 17 | Idle | IDLE | NOP | IDLE | Idle |

A detailed explanation of the internal workings of an I²C write sequence is now given with reference to Table 4.

At 0 both parent and child state machines are in the IDLE state. Both parent and child I²C bus are idle, i.e. no device on either bus is pulling SCL or SDA low.

At 1 the I²C master device on the parent I²C bus generates a START condition, i.e. SDAp is pulled low while SCL is high, after which SCLp is pulled low. The parent module state machine detects this.

At 2, in response to the detected START condition on the parent I²C bus, the parent module state machine moves (302) to the RX_BYTE state. As this happens, the first-byte register in the parent module is set to '1'. The DATA register bit counter 122 is reset and increments with 1 for every rising edge on SCLp. At this rising edge the value of SDAp (high or low) is shifted into the 8-bit DATA register 124.

At 3 the DATA register bit counter has counted 8 rising edges, so according to the I²C specification, the I²C master device on the parent bus will check for a bus acknowledge (ACK). The I²C master will do this at the next rising edge of SCLp. However, the START condition and following DATA needs to be reproduced on the child I²C bus, for the parent module to know whether the child I²C bus will ACK or NACK the DATA. So as the parent module awaits this information, SCLp is forced low by the parent module's stretch flag 108, so that when the I²C master releases SCLp to allow the pull-up resistor between SCLp and the power supply line to generate a rising edge, this rising edge will not occur.

As the parent module state machine transitions from RX_BYTE to AWAIT_ACK, an IBIM{START, <data register contents>} (306) is presented to the link. The first_byte register now is set to '0'. The parent module will remain in the AWAIT_ACK state (308) until it receives a message from the link.

At 4 the child module has received IBIM{START, data byte}, in response to which it transitioned to the TX_START state 350.

In case of N child buses {1, . . . , N}, as exemplified in FIG. 7, the child module can dispose of an address-to-child-bus-index table (see left and middle column of Table 8). This table provides a mapping of seven-bit I²C device addresses to an child bus index, i.e. the number {1, . . . , N} of the child bus. The DATA field in the received IBIM is used to look up the device address and the according current child bus index M (1<=M<=N) is stored by the child module. All following child I²C bus traffic is directed to child I²C bus with the current child bus index M, until the current child bus index M changes. This is the only point in an I²C transaction where the current child bus index M can change. All child I²C buses other than the current child bus are left floating. For brevity, from here on, child I²C bus will refer to the current child bus in the examples.

The least significant bit of the IBIM DATA field contains the I²C address byte R/W bit. This bit is stored in the is_reading register, for the child module to know if the master is performing an I²C read or write sequence.

The I²C transceiver in the child module produces an I²C start condition on the child I²C bus by first pulling SDAc low. Half the period of the child I²C bus later, SCLc is pulled low. The child module state machine now transitions (352) to TX_BYTE.

At 5 the child module continues to cycle the child I²C bus clock SCLc, while pulling SDAc low or not after each falling edge of SCLc, according to the DATA field value in the previously received IBIM. When all 8 bits have been clocked out on the child I²C bus, i.e. after 8 falling edges of SCLc and the byte is thus sent, SDAc is released and the child module state machine transitions (354) to RX_ACK.

At 6, when the child module machine sees a rising edge on SCLc, it samples SDAc.
- If SDAc is '0', this means a device on the child I²C bus is pulling SDAc low, which stands for an I²C ACK. IBIM{ACK} is presented on the link.
- If SDAc is '1', no device on the child I²C bus is pulling SDAc low, which stands for an I²C NACK. IBIM{NACK} is presented on the link. See Example C of this type of sequence.

At 7, provided an acknowledge was received on the I²C child bus in the previous step, the R/W bit in the device address, stored in the is_reading register is checked. If this bit is '1', the master is reading and the child module transitions (356) to RX_BYTE. The internal steps followed in an I²C read sequence are described in a later example. If this bit is '0', the master is writing and the child module transitions (358) to AWAIT_IBIM, where it will keep SCLc low. Any slave device listening on the I²C sequence will now wait. An IBIM with the ACK event is received by the parent module. The parent module transitions (310) to the TX_ACK state.

At 8 the parent module pulls SDAp low and releases SCLp, so it can be pulled up. After a falling edge occurs on SCLp, SDAp is release. In this example the master is writing, so the parent module state machine transitions (312) to the RX_BYTE state. If the master was reading, it would transition (314) to AWAIT_BYTE.

At 9 the same happens as described for line 2, except that now no START condition happened before entering this state.

At 10 the DATA register bit counter has counted 8 rising edges, so according to the I²C specification, the I²C master device on the parent bus will check for a bus acknowledge (ACK). The I²C master will do this at the next rising edge of SCLp. However, the DATA needs to be reproduced on the child I²C bus, for the parent module to know whether the child I²C bus will ACK or NACK the DATA. So as the parent module awaits this information, SCLp is forced low by the parent module, so that when the I²C master releases SCLp to allow the pull-up resistor between SCLp and the power supply line to generate a rising edge, this rising edge will not occur.

As the parent module state machine transitions from RX_BYTE to AWAIT_ACK, an IBIM{DATA, <data register contents>} (316). The parent module will remain in the AWAIT_ACK state until it receives a message from the link. Upon receipt of the IBIM{DATA, <data register contents>}, the child module transitions (372) to TX_BYTE.

At 11 the same happens as at 5.
At 12 the same happens as at 6.
At 13 the same happens as at 7.
At 14 the same happens as at 8.
At 15 a STOP condition occurs on the parent I²C bus. In response, the parent module returns (304) to the IDLE state, leaving SCLp and SDAp floating and presents an IBIM{STOP} to the link (318).
At 16 the parent module is completely idle. The child module receives the IBIM{STOP} (360) and produces a STOP event.
At 17 all is IDLE as was at 1.

Example B: Description of an I²C Read Sequence

In case of an I²C read sequence, lines 0 to 6 are identical to the I²C write sequence of the previous example, except that the DATA in the IBIM containing a START event would have an LSB equaling '1'. Steps 7 and further are shown in Table 5 and discussed below.

TABLE 5

| | Parent I²C bus | Parent module state | Link msg | Child module state | Child I²C bus |
|---|---|---|---|---|---|
| 7b | Module stretching | AWAIT_ACK | < ACK < | RX_BYTE | Data byte |
| 8b | Sending ack | TX_ACK | < DATA < | AWAIT_IBIM | Module stretching |
| 9b | Module stretching | AWAIT_BYTE | < DATA < | AWAIT_IBIM | Module stretching |
| 10b | Sending data byte | TX_BYTE | NOP | AWAIT_IBIM | Module stretching |
| 11b | NACK | RX_ACK | NOP | AWAIT_IBIM | Module stretching |
| 12b | Stop condition | RX_BYTE | > NACK > | AWAIT_IBIM | Module stretching |
| 13b | Idle | IDLE | > STOP > | TX_NACK | Sending NACK |
| 14b | Idle | IDLE | > STOP > | AWAIT_IBIM | Module stretching |
| 15b | Idle | IDLE | NOP | SEND_STOP | Stop condition |
| 16b | Idle | IDLE | NOP | IDLE | Idle |

At 7b the R/W bit in the device address stored in the is_reading register is checked. In this case this bit is '1', the master is reading and the child module transitions (356) to RX_BYTE. At 8b the parent module has received the IBIM{ACK} and transitions (310) to the TX_ACK state. To generate the I²C ACK event, SDAp is pulled low and SCLp is released. So the SCLp can be pulled up by the resistor between SCLp and the power supply line, resulting in a rising edge which is detected by the I²C master device. As the I²C master detects this rising edge, it samples the SDAp line, which is low, and an ACK is interpreted.

Depending on the difference in SCLp and SCLc, i.e. if the frequency of SCLc is 10 times that of SCLp, the child module may have already produced 8 rising edges on SCLc. In a fashion similar to how the parent module counts bits and produces the DATA register contents explained in step 2 and 3, the child module now has a data register 174. An IBIM{DATA, data register contents} is presented to the link. Since the parent module is still in the TX_ACK state, it does not yet acknowledge this IBIM: the IBIM remains on the link.

The child module now transitions (362) to the AWAIT_IBIM state, expecting an ACK or NACK from the master device.

At 9b the parent module has moved (314) to the AWAIT_BYTE state and can accept the IBIM{DATA, I²C byte}, causing a state transition (322) to TX_BYTE,
the data register bit counter (122) to be reset
I²C byte in the received IBIM to be copied to the data register (124)
SCLp to be released.

At 10b the data register bit counter (122) is incremented upon every falling edge of SCLp and the next bit of the data register (124) is presented on SDAp. Once 8 bits are counted, an ACK or NACK follows from the master device, so the parent module transitions (324) to the RX_ACK state.

At 11b in the RX_ACK state, when SCLp shows a rising edge, the parent module samples SDAp.

If SDAp is '0', the master has sent an ACK, IBIM{ACK} is presented to the link and the parent module moves 320 to the AWAIT_BYTE state, stretching SCLp. It would be like jumping back to step 7b.

If SDAp is '1', the master has sent a NACK, indicating it wants to read no more, IBIM{NACK} is presented to the link and the parent module moves (326) to the RX_BYTE state, in order to keep the parent I²C bus released, expecting a STOP condition from the master At 12b the I²C master produces an I²C Stop condition on the parent I²C bus, resulting in the parent module to present an IBIM{STOP} (318) to the link. The parent module now moves to the IDLE state. The child module receives the IBIM{NACK} and transitions (364) to the TX_NACK state. At 13b the child module maintains SDAc released and releases SCLc, allowing a rising edge to be caused by the resistor between SCLc and the power supply line. As this rising edge occurs, an I²C NACK event occurs on the child I²C bus. The IBIM with a STOP event which is currently presented by the link to the child module is not accepted since it can only do this in the AWAIT_IBIM state. After reproducing the not-acknowledge (NACK) on the child I²C bus, the child module transitions (366) to the AWAIT_IBIM state, pulling SCLc low to stretch the child I²C bus.

At 14b the IBIM with a STOP event is accepted by the child module and the child module transitions to the SEND_STOP state. An I²C stop condition is generated by the child module's I²C transceiver as follows:

SDAc is pulled low

SCLc is released, causing a rising edge on SCLc

Half the period of SCLc after the child module's I²C transceiver detects a rising edge on SCLc, SDAc is released, causing a rising edge on SDAc while SCLc is high. This is an I²C stop condition.

Example C: I²C Sequence where No ACK Occurs on the Child I²C Bus

In case a NACK is detected on the child I²C bus in step 6, details are given in Table 6 below of how a typical I²C sequence would occur.

TABLE 6

| | Parent I²C bus | Parent module state | Link msg | Child module state | Child I²C bus |
|---|---|---|---|---|---|
| 6c | Module stretching | AWAIT_ACK | NOP | RX_ACK | NACK |
| 7c | Module stretching | AWAIT_ACK | < NACK < | AWAIT_IBIM | Module stretching |
| 8c | Sending nack | TX_NACK | NOP | AWAIT_IBIM | Module stretching |
| 9c | Stop condition | RX_BYTE | NOP | AWAIT_IBIM | Module stretching |
| 10c | Idle | IDLE | > STOP > | AWAIT_IBIM | Module stretching |
| 11c | Idle | IDLE | NOP | SEND_STOP | Stop condition |
| 12c | Idle | IDLE | NOP | IDLE | Idle |

At 6c, as explained in step 6 of Example A, an I²C NACK event is detected on the child I²C bus. This results in the child module transitioning to AWAIT_IBIM and presenting IBIM{NACK} to the link with a (368) event. The SCLc of the child I²C bus is pulled low.

At 7c the parent module receives an IBIM with a NACK event from the link, causing the state machine to transition (328) to TX_NACK.

At 8c SDAp is released. When the I²C transceiver of the parent module detects that SDAp has indeed transitioned to a '1', and after at least a quarter of a SCPp period, SCPp is released, allowing for a rising edge to occur on SCPp and the I²C master device to detect the NACK event. The parent module state machine transitions (330) to RX_BYTE and keeps the parent I²C bus released.

At 9c, same as 14b.
At 10c, same as 15b.
At 11c, same as 16b.

The three examples A, B, C above show how any typical I²C sequence is handled by the bridge device of the invention.

In case of a slave on any child I²C bus stretching the clock indefinitely, also the parent I²C bus locks up, since the parent I²C bus is being stretched while waiting for a response from the child I²C bus. This is similar to an I²C bus where no bridge is present. In such case, one would usually power cycle all I²C slave devices on the bus using a general purpose I/O pin on the I²C master, which is able to detect such condition. In the case where the bridge is applied in a system where master and slave buses are on separate boards, the parent module can be equipped with a reset input. The parent module state machine is then modified so as to generate an IBIM with an ERROR event. This is then sent to all child modules, which, equipped with a reset output, will cause a digital transition on that output. After detecting such reset condition, parent and child module will return to the IDLE state.

Since the buffering happens at the byte level, a delay is inherent to the bridge. For every I²C event (START/STOP/ACK/NACK/DATA), the time it takes to occur, equals $$t_{parent\ I2C\ bus} + t_{link} + t_{child\ I2C\ bus}$$

where $t_{parent\ I2C\ bus}$ denotes the time taken on the parent I²C bus, $t_{child\ I2C\ bus}$ the time taken on the child I²C bus and $t_{link}$ the time taken by the link to forward a message from one end to the other. For example, a DATA event takes 8 SCLp cycles on the parent bus, an internal delay of the link to propagate the IBIM, and 8 SCLc cycles on the child bus. If the internals of the bridge are accepted to work at a system clock significantly faster than the typical I²C clock speeds, i.e. several MegaHertz, and the IBIM to be transferred in 2 or 3 system clock cycles, the delay introduced by the link $t_{link}$ can be neglected. Calculating the delay by dividing the event time $t_{bridge}$ by the event time in a system with no bridge $t_{straight}$ for a DATA event, one gets $$\text{delay} = \frac{t_{bridge}}{t_{straight}} = \frac{t_{parent\ I2C\ bus} + 8 \cdot t_{SCL_p} + t_{child\ I2C\ bus}}{t_{parent\ I2C\ bus}} = \frac{8 \cdot t_{SCL_c}}{8 \cdot t_{SCL_p}} = 1 + \frac{t_{SCL_c}}{t_{SCL_p}}$$

This means there is always a relative delay >1. In case the child bus is equally fast as the parent bus, this delay is a factor 2. In case the child bus is 10 times faster than the parent bus, this is reduced to a factor 1,1.

The address collision and voltage incompatibility problems are resolved in this invention by allowing multiple child I²C buses connecting on a child module and by having the child module look up to which child I²C bus to direct an I²C sequence based on the I²C device address and a look-up table as explained in step 4 in Example A.

Take the example system with three child I²C buses, configured as

TABLE 7

| Child I²C bus Index | Bus Voltage | Bus speed |
|---|---|---|
| 0 | 3.3 | 100 kHz |
| 1 | 3.3 | 100 kHz |
| 2 | 1.8 | 1 MHz |

An address-to-child-bus-index look-up table may look like this

TABLE 8

| Device address | Bus index | Actual address |
|---|---|---|
| 0x0D | 0 | 0x0D |
| 0x0E | 1 | 0x0D [1] |
| 0x14 | 2 | 0x14 |
| 0x15 | 2 | 0x15 |
| <other> | 1 | <unchanged> |

[1] Note how the actual address is different from the device address used by the I²C master. This is device address translation.

Notice how, when the I²C master device uses 0x0E for a device address, the child module translates this to 0x0D on bus 1. 0x0D is translated to 0x0D on bus 0. This allows for two I²C devices with the same address to be addressed by one and the same master. Also notice how I²C sequences for devices with addresses 0x14 and 0x15 are redirected to the faster (1 MHz instead of 100 kHz) bus running at a different voltage (1.8V instead of 3.3V) child I²C bus with index 2. Finally, one could choose for a default child I²C bus to be used for addresses not present in the look-up table.

The bridge device according to this invention can be implemented with purely digital blocks, such as an FPGA, a complex programmable logic device (CPLD) or an ASIC.

An address-to-child-bus look-up table as used in certain embodiments can be implemented in several different ways. Some examples are:

- As a fixed look-up table
- As a programmable look-up table, accessible from the I²C master, i.e. implemented as an internal I²C slave where the look-up table contents are represented as typical I²C registers.
- As a range, e.g. with the address 2 MSBs translating to the child bus number
  - 0→31: child bus 0
  - 32→63: child bus 1
  - 64→95: child bus 2
  - 96→127: child bus 3

In an aspect the invention relates to a communication system comprising at least one master device, at least one slave device and in between a bridge device as previously described. Such a communication system offers several advantages. It is sufficient to have only one central master device. Moreover, that master device is transparent and does not need to adapt, e.g. because of I²C slave devices that use another I/O voltage than the master, because it is impossible to bring SCL and SDA 'directly' (electrically) because of separated Printed Circuit Boards or because of distinct devices listening to the same address. Further, an 'ACK' keeps its full meaning: it is not needed to assume that an ACK will occur. This also implies that if an ACK is received, it indeed has been sent by the other side of the communication system. Further, the sender knows that the data effectively has been received.

One exemplary embodiment of a communication system according to the invention is a system where two separate PCBs exist, one master PCB with a microcontroller containing an I²C master, which is connected to an FPGA. The FPGA is configured to work as a parent module, listening on the parent I²C bus which is connected to the microcontroller's I²C master. The other PCB, the slave PCB, is connected to the master PCB with a fast coaxial full-duplex link, which also provides power from the master to the slave PCB. The FPGA on the slave PCB is configured to work as slave module. The FPGAs on both PCBs are connected to this link, and use it to communicate with each other. This coax link can be used as bridge link between both modules, but can at the same time accommodate many other types of data streams.

While the invention has been illustrated and described in detail in the drawings and foregoing description, such illustration and description are to be considered illustrative or exemplary and not restrictive. The foregoing description details certain embodiments of the invention. It will be appreciated, however, that no matter how detailed the foregoing appears in text, the invention may be practiced in many ways. The invention is not limited to the disclosed embodiments.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A bridge device operable between a master device and a slave device of a communication system, said master device and said slave device arranged for communicating with each other via a parent I$^2$C bus and a child I$^2$C bus and using the I$^2$C protocol, said bridge device comprising
a parent module at one side of said bridge device, said parent module arranged for connecting said parent I$^2$C bus and comprising a parent I$^2$C transmitter/receiver device and a parent module state machine,
a child module at the opposite side of said bridge device, said child module arranged for connecting said child I$^2$C bus and comprising a child I$^2$C transmitter/receiver device and a child module state machine,
whereby said parent module and said child module each comprise an internal bridge interface to exchange messages between said parent module and said child module, said messages being generated by said parent module state machine or said child module state machine in response to a change of state caused by an event on their respective I$^2$C buses,
whereby said parent module and said child module are each arranged for translating an I$^2$C event to a message and for forwarding said message to the module at the other side of the bridge device via said internal bridge interfaces, said module at the other side being arranged for further transmitting said message as an I$^2$C event towards the I$^2$C bus at the other side of the bridge device, and
whereby said parent module and said child module are further each arranged for holding the communication towards the respective I$^2$C bus by stretching a clock line on their respective I$^2$C bus until a message, based on an event occurring on the I$^2$C bus at the other side of the bridge device and instructing continuation of the communication, is received via said internal bridge interfaces from the module at the other side of the bridge device,
wherein the bridge device buffers a single I$^2$C byte from the master device and holds the communication on the master device by stretching the clock line on the I$^2$C bus of the parent module until the bridge device has received a response from the slave device, or wherein the bridge device buffers a single I$^2$C byte from the slave device and holds the communication on the slave device by stretching the clock line on the I$^2$C bus of the child module until the bridge device has received a response from the master device;
whereby said I$^2$C protocol is not a Layered I$^2$C protocol.

2. Bridge device as in claim 1, wherein the internal bridge interfaces of said parent module and said child module are connected via a bidirectional coaxial communication link.

3. Bridge device as in claim 2, wherein said bidirectional coaxial communication link comprises in each direction a First-In-First-Out buffer.

4. Bridge device as in claim 2, wherein said bidirectional coaxial communication link also contains an off-board link.

5. Bridge device as in claim 1, wherein said child module is arranged for connecting a plurality of child I$^2$C busses.

6. Bridge device as in claim 1, wherein said child module comprises an address-to-I$^2$C child bus index table.

7. Bridge device as in claim 1, wherein said message is caused by either an I$^2$C start condition followed by an I$^2$C device address, an I$^2$C stop condition, an I$^2$C acknowledge, an I$^2$C not-acknowledge or an I$^2$C byte.

8. Bridge device as in claim 1, implemented using a field-programmable gate array, a complex programmable logic device or an application specific integrated circuit.

9. Bridge device as in claim 1, wherein said parent module comprises a digital input pin on which an external pulse can trigger the transmission of an error message to said child module and wherein said child module comprises a digital output pin to generate a pulse in response to receipt of said error message.

10. Communication system comprising at least one master device, at least one slave device and a bridge device as in claim 1, wherein said at least one master device and said at least one slave device are arranged for communicating with each other via a parent I$^2$C bus and a child I$^2$C bus and using the I$^2$C protocol.

* * * * *